United States Patent [19]

Nishizawa

[11] Patent Number: 5,687,144

[45] Date of Patent: Nov. 11, 1997

[54] AUDIO PLAYER FOR REPRODUCING WRITING DATA AS AUDIO SIGNALS

[75] Inventor: Tatsuo Nishizawa, Ueda, Japan

[73] Assignee: Shinano Kenshi Kabushiki Kaisha, Nagano-ken, Japan

[21] Appl. No.: 742,496

[22] Filed: Nov. 1, 1996

[30] Foreign Application Priority Data

Nov. 1, 1996 [JP] Japan ................... 7-285329

[51] Int. Cl.$^6$ ................... G11B 17/22
[52] U.S. Cl. ................... 369/33; 369/32
[58] Field of Search ................... 369/7, 33, 32, 369/31, 63, 64, 65, 66, 67, 68, 69, 275.3; 434/316, 317, 318, 319, 320

[56] References Cited

U.S. PATENT DOCUMENTS 4,636,881  1/1987  Brefka et al. ................... 369/31
4,809,246  2/1989  Jeng ................... 369/31
5,596,565  1/1997  Yonemitsu et al. ................... 369/275.3

*Primary Examiner*—Tan Dinh
*Attorney, Agent, or Firm*—Birch, Stewart, Kolasch & Birch, LLP

[57] ABSTRACT

An object of the present invention is to provide an audio player, which is capable of efficiently retrieving writing data of groups of sentences and noticing the present writing data by audio signals. In the audio player, a control section reads a plurality of retrieving tables in a recording medium by a reading section and stores the same in a memory section. The control section selects a selected retrieving table and retrieves the group of sentences therein when the input section inputs commands for selecting the selected retrieving table and retrieving the same. The control section reads a reproduction-starting position of the retrieved group of sentences and the writing data of the retrieved group by the reading section. Then the control section reproduces the writing data thereof, as audio signals, by an audio reproducing section.

6 Claims, 4 Drawing Sheets

FIG. 3

TABLE STRUCTURE

| POSITION OF STARTING SECTOR (m: s: f) | SIZE OF ANNOUNCE MESSAGE (bytes) | LAYER DATA CHAPTER | PARAGRAPH | SECTION |
|---|---|---|---|---|
| 2:00:00 | 665 | 1 | 1 | 1 |
| 3:04:05 | 911 | 1 | 1 | 2 |
| 11:08:25 | 315 | 1 | 1 | 3 |
| 22:15:45 | 939 | 1 | 1 | 1 |
| 28:35:20 | 819 | 1 | 2 | 2 |
| 33:54:74 | 327 | 2 | 2 | 1 |
| 35:15:39 | 211 | 2 | 1 | 2 |
| 39:24:19 | 150 | 2 | 1 | 3 |
| 42:38:58 | 265 | 2 | 2 | 1 |
| 45:45:17 | 665 | 2 | 2 | 2 |

CLASSIFIED STRUCTURE OF BOOK

CHAPTER / PARAGRAPH / SECTION

FIG. 4
TABLE STRUCTURE

| PAGE OF BOOK | POSITION OF STARTING SECTOR (m: s: f) | SIZE OF ANNOUNCE MESSAGE (bytes) | UNITS OF DIGITS | | |
|---|---|---|---|---|---|
| | | | 100 | 10 | 1 |
| 1 | 2:00:00 | 665 | 0 | 0 | 1 |
| 2 | 2:20:01 | 911 | 0 | 0 | 2 |
| ⋮ | | | | | |
| 9 | 2:35:25 | 315 | 0 | 0 | 9 |
| 10 | 4:15:45 | 939 | 0 | 1 | 0 |
| 11 | 4:35:20 | 819 | 0 | 1 | 1 |
| ⋮ | | | | | |
| 99 | 33:54:74 | 327 | 0 | 9 | 9 |
| 100 | 34:15:39 | 211 | 1 | 0 | 0 |
| 101 | 35:24:19 | 150 | 1 | 0 | 1 |
| ⋮ | | | | | |
| 109 | 42:38:58 | 265 | 1 | 0 | 9 |
| 110 | 45:45:17 | 665 | 1 | 1 | 0 |
| ⋮ | | | | | |

AUDIO PLAYER FOR REPRODUCING WRITING DATA AS AUDIO SIGNALS

BACKGROUND OF THE INVENTION

The present invention relates to an audio player for reproducing writing data, which are recorded on a recording medium, e.g., a CD-ROM, as audio signals.

Conventionally, audio players, which are capable of reproducing writing data as audio signals, are called "audio book" and especially used for blind persons' reading. The conventional audio book plays a cassette tape, so writing data are sequentially read by the device.

To select and listen to audio signals (voice) which are written on the cassette tape as writing data, the object writing data are retrieved by listening to tone signals, which cannot be heard by our ears when the cassette tape is normally played, and which can be heard when the cassette tape is forwarded or rewound fast.

However, the conventional audio book has following disadvantages.

The tone signals are heard by forwarding or rewinding the tape fast, so it is difficult to access to object writing data. In the case that the tone signals are assigned to large retrieving units or upper level retrieving units, e.g., chapters of a book, object writing data in lower retrieving units, e.g., paragraph and section of the book, should be selected by checking signals for changing page or counting number of signals. Thus, it is difficult for beginners to use the conventional device.

These days, many electric or electronic appliances are used in houses, so it is necessary for blind persons to read operating manuals of the appliances and special books. Unlike literary books, the operating manuals and the special books are not read from the beginning. We usually read necessary parts of the operating manual, so an audio player which is capable of correctly and rapidly selecting object writing data is desired.

Further, in the conventional device, present writing data being read are known by checking tape number or tape counter, so it is difficult to precisely search beginnings of groups of sentences or the retrieving units.

SUMMARY OF THE INVENTION

An object of the present invention is to provide an audio player, which is capable of efficiently retrieving writing data of groups of sentences, which are recorded on a random-accessible recording medium, e.g., a CD-ROM, and noticing the present writing data by audio signals (voice).

To achieve the object, the audio player of the present invention has following structures.

Namely, the audio player for reproducing writing data as audio signals, comprising:
- a reading section for reading writing data and a plurality of retrieving tables, each of which includes data indicating interrelationship between each group of sentences in the writing data and a reproduction-starting position of each group thereof, from a recording medium;
- an input section for inputting a command for selecting the retrieving table and a command for retrieving the groups of sentences in the selected retrieving table;
- a memory section for storing the retrieving table;
- an audio reproducing section for converting the writing data into audio signals; and
- a control section reading the retrieving tables from the recording medium by the reading section and storing the same in the memory section, the control section retrieving the group of sentences in a selected retrieving table, which is selected by the input section, in the memory section when the input section inputs the commands for selecting and retrieving, the control section reading the reproduction-starting position of the retrieved group of sentences, the control section reading the writing data of the retrieved group by the reading section and reproducing the writing data thereof, as audio signals, by the audio reproducing section.

With this structure, the desired retrieving table can be selected, so that the object group of sentenced can be efficiently retrieved.

In the audio player, the retrieving table may have a multilayered data structure including such layers of the groups of sentences as chapters, paragraphs and sections, which correspond to head lines in a table of contents of a book, the input section may designate one of data layers of the retrieving table as a layer to be retrieved, and the control section may retrieve the group of sentences in a designated layer in the retrieving table, which is stored in the memory section, the control section may be capable of retrieving each chapter, each paragraph and each section, the control section may retrieve the group of sentences in the designated layer.

With this structure, the reproduction-starting positions in the chapter layer, the paragraph layer or the section layer can be directly known, so the object group of sentences can be further efficiently retrieved.

In the audio player, the recording medium may be a CD-ROM, the reproduction-starting position may be a sector position of the group of sentences, the input section may be capable of inputting moving time and moving direction from a present reading position to the reproduction-starting position of an object group of sentences, and the control section may read the sector position of the present reading position by the reading section when the moving time and the moving direction are inputted by the input section, the control section may find moving data according to the moving time and may find the reproduction-starting position of the object group of sentences according to the moving data, the present sector position and the moving direction.

With this structure, the next reproduction-starting position can be designated as length of time from the present reading position, e.g., 5 minutes to the present reading position, 10 minutes from the present reading position.

In the audio player, the retrieving table may include identification data of each group of sentences, the input section may be capable of inputting an instruction to notice, and the control section may read the identification data of the present group of sentences from the memory section and reproduce the identification data as audio signals by the audio reproducing section when the input section inputs the instruction to notice.

With this structure, the present reading position, e.g., a present chapter, a present paragraph, a present page number, can be noticed by the audio signals.

Function of the audio player will be explained.

The control section controls the reading section to store the retrieving tables, which have been recorded on the recording medium, in the memory section. When the commands for selecting and retrieving are inputted by the input section, the groups of sentences, which are included in the selected retrieving table in the memory section, are retrieved on the basis of the command for retrieving. The reproduction-starting position of the retrieved group is read. The writing data corresponding to the reproduction-starting position are read by the reading section and reproduced as the audio signals by the audio reproducing section. Thus, writing data in a book or books can be efficiently retrieved.

In the audio player of the present invention, desired retrieving tables can be selected, so the desired group of sentences rapidly retrieved and reproduced as the audio signals. If the retrieving table, which corresponds to the table of contents of a book, has the multilayered data structure including the layers of the chapters, the paragraphs and the sections, the reproduction-starting positions can be designated in each layers, so the reproduction-starting positions can be directly designated and the writing data can be further efficiently reproduced as the audio signals. The reproduction-starting positions can be designated according to the data of page number, the moving time and the moving direction. By combining this manner, many kinds of data retrieval can be executed. Further, if the identification data, e.g., an announce message indicating the present reading position, of each group of sentences are added in the retrieving table, the present reading position of the book can be noticed by announcing, for example, the chapter, the paragraph, the section, or the page number. With this manner, the data retrieval can be further easily and rapidly executed.

BRIEF DESCRIPTION OF THE DRAWINGS

An embodiment of the present invention will now be described by way of examples and with reference to the accompanying drawings, in which:

FIG. 3 is an explanation view of a retrieving table (a contents table) of a book shown in FIG. 1;

FIG. 4 is an explanation view of a retrieving table (a page table) of the book shown in FIG. 1;

DETAILED DESCRIPTION OF THE PREFERRED EMBODIMENT

A preferred embodiment of the present invention will now be described in detail with reference to the accompanying drawings.

Figure 1:
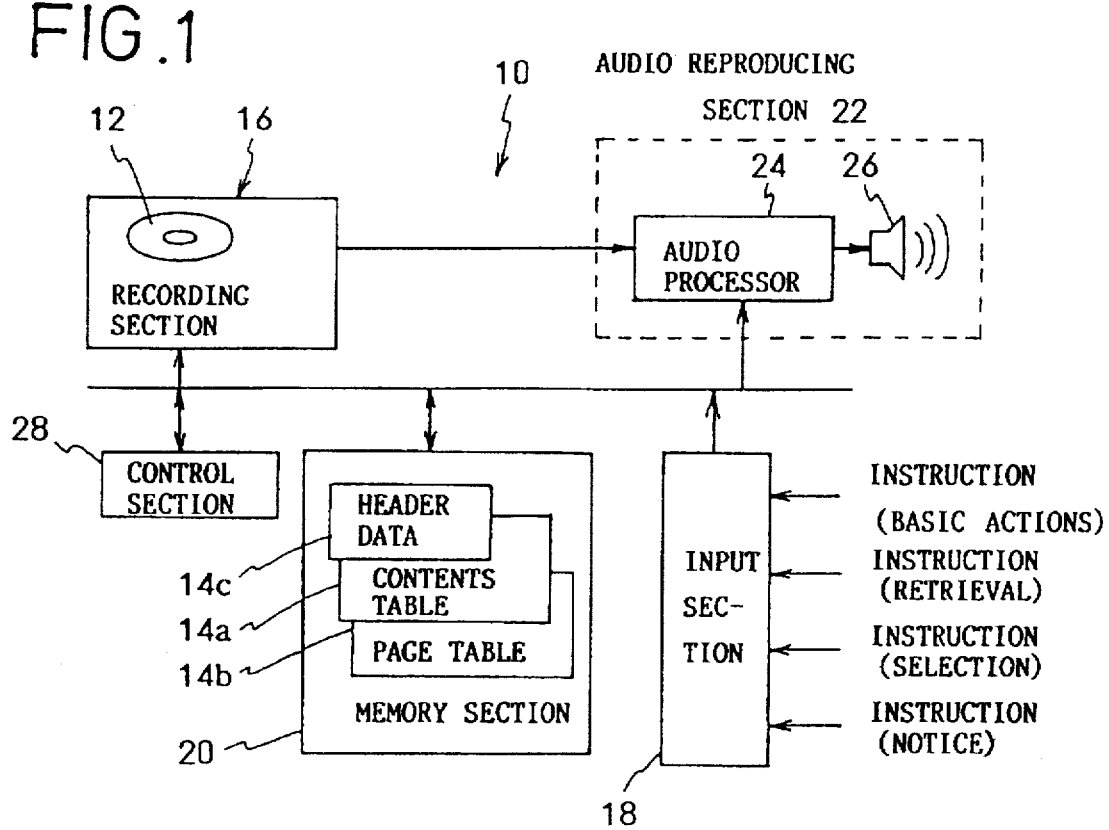
FIG. 1 is a block diagram of the audio player of an embodiment of the present invention.
Figure 2:
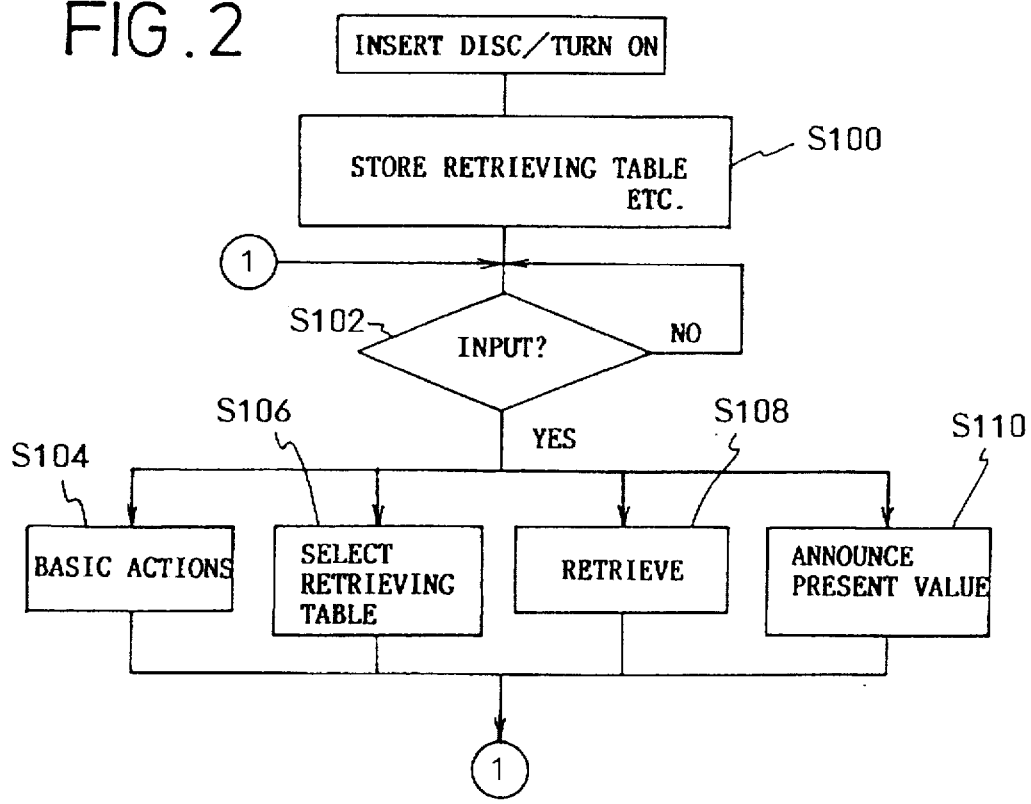
FIG. 2 is a flow chart showing action of the audio player.

A basic structure and summarized action of the audio player of the present embodiment will be explained with reference to FIG. 1. Note that, a CD-ROM is used in the audio player 10 of the present embodiment as a random accessible recording medium, but a flexible disk and an IC card including a semiconductor element, e.g., RAM, may be used as said recording medium.

Writing data of a book or books and retrieving tables, each of which includes table data indicating interrelationship between each group of sentences, which includes a head line, in the writing data and a reproduction-starting position of each group thereof, are recorded in the CD-ROM 12. Namely, the groups of sentences correspond to head lines in a table of contents of each book. In the present embodiment, the writing data of a plurality of books are recorded in the CD-ROM 12. As shown in FIGS. 3 and 4, the retrieving tables are: a contents table including data of positions of starting sectors of each head lines, which correspond to chapters, paragraphs, and sections, of a table of contents of each book; and a page table including data of positions of starting sectors of each page. The data of each starting sector indicate length of time (minute and second) from a record-starting position of the CD-ROM 12 and sector number counted therefrom. For example, if the data of the starting sector are "2:35:25", the starting sector is the 25th sector, which is a position 2 minutes 35 seconds from the record-starting position of the CD-ROM 12.

Figure 5:
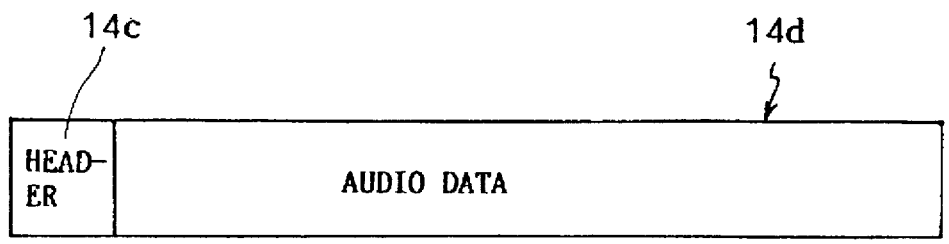
FIG. 5 is an explanation view showing a structure of an audio data file recorded on a CD-ROM.

In FIG. 5, a structure of an audio data file 14d is shown. A header, which includes: a reproduction-starting position of the audio data; data size of the audio data; and bit rate of the audio data, is provided at a front end of the audio data file 14d. The header is usually required to have size of tens bytes, so the header can be ignored with respect to size of audio data. The data in the header is used when reading position is changed on the basis of designated moving time, or when elapsed time or time left is noticed to a user.

The retrieving data may be divided into retrieving items, e.g., head lines, page, as described above; the retrieving data may be collected as a large retrieving table.

In the present embodiment, the writing data are contents of the books, namely voice of reading books is converted into digital signals, and the digital signals are recorded on the CD-ROM 12 as the audio data files 14d.

As shown in FIG. 3, the contents table 14a has a multi-layered data structure including layers of chapters, paragraphs and sections. In the chapter layer, each chapter (Chapter 1, Chapter 2, ... ) is the group of sentences; in the paragraph layer, each paragraph (Paragraph 1, Paragraph 2, ... ) is the group of sentences; in the section layer, each section (Section 1, Section 2, ... ) is the group of sentences. On the other hand, in the page table 14b, as shown in FIG. 4, each page is the group of sentences.

A reading section 16 reads the data on the CD-ROM 12. The reading section 16 has: a motor (not shown) for rotating the CD-ROM 12; an optical pickup (not shown) for reading the data from the CD-ROM 12; a servo control unit (not shown) for controlling the motor and the optical pickup; and electronic circuits including a signal processing circuit, which converts high frequency signals read by the optical pickup into digital signals. If signals indicating the sector position are inputted to the servo control unit, the servo control unit access to said sector to read the writing data.

An input section 18 is capable of inputting a command for selecting the retrieving table and a command for retrieving the groups of sentences in the selected retrieving table so as to know the reproduction-starting position of object writing data. The input section 18 has: operating keys (not shown) for designating basic operations, e.g., play, stop, fast forward, reverse play, fast play, fast reverse play, pause; a select key, which is, for example, a slide switch, wherein the select key is capable of moving to a "contents" position, at which the select key designates the contents table 14a, a "page" position, at which the select key designates the page table 14c, and a "time" position, at which the select key designates the function of changing the reproduction-starting position on the basis of designated moving time, and noticing the elapsed time, the time left, of total time.

The retrieving keys are four direction push keys: "↑", "↓", "←" and "→". They may be optionally arranged. The retrieving keys designate retrieving conditions in the selected retrieving table. Note that, the select key and the retrieving keys are not restricted to the slide key and the push keys, they may be other types of keys, e.g., a mouse.

A memory section 20 includes semiconductor devices: ROMs, RAMs, etc. The memory section 20 stores the retrieving tables 14a and 14b, header data 14c of the audio data files 14c, control programs of a CPU, etc.

An audio reproducing section 22 includes: an audio processor 24 for converting the digital signals of the writing data, which are read from the audio file of the CD-ROM 12, into analogue audio (voice) signals; and a speaker 26 for outputting the audio signals from the audio processor 24. Note that, if the data in the audio file are compressed, the data are extended to former PCM data according to the bit rate in the header (see FIG. 5), then the extended data are D/A converted to the analogue audio signals.

A control section 28 includes the CPU. When the input section 18 inputs the commands for selecting and retrieving, the control section 28 selects one retrieving table (the selected retrieving table) 14a or 14b according to the command for selecting, then the control section 28 retrieves the group of sentences in the selected retrieving table and reads its reproduction-starting position. The control section 28 reads the writing data in the CD-ROM 12, by the reading section, on the basis of the reproduction-starting position, and reproduces the writing data as the audio signals by the audio reproducing section 22.

Next, detail structures of the retrieving tables 14a and 14b and the audio data file 14c will be explained. The data of the sector positions, described later, are defined with respect to the record-starting position of the CD-ROM 12.

In the contents table 14a, as shown in FIG. 3, the data of the starting sectors of each head lines of each book, which correspond to, in the present embodiment, each chapter, each paragraph and each section are recorded. Note that, the sections are the group of sentences in the lowest level layer of the multilayered data structure, so the data of the starting sectors of each section are recorded in order, e.g., "Chapter 1-Paragraph 1-Section 1", "Chapter 1-Paragraph 1-Section 2", "Chapter 1-Paragraph 1-Section 3", "Chapter 1-Paragraph 2-Section 1", ..... Layer data 30 for identifying the layers are added, so the group of sentences or groups thereof can be retrieved layer (the chapter, the paragraph and the section) by layer with reference to the layer data 30.

In the page table 14b shown in FIG. 4, the data of the starting sectors of each page of the audio files (the books), which have been recorded on the CD-ROM 12, are recorded according to the page number. To designate the page number as the reproduction-starting position, data of "UNITS OF DIGIT" 32, which include the page number of units "1", the page number of tens "10" and the page number of hundreds "100", are added to the page table 14b.

In the audio data file 14c shown in FIG. 5, data are recorded with the bit rate of, for example, 64 kilo bits per second. The position of the starting sector is, for example, "02 min.-00 sec.-00 frame"; the position of a final sector is, for example, "60 min.-00 sec.-00 frame". Thus, relative number of sector between the starting sector and the final sector is "58 min.-00 sec.-00 frame", so total data number of recorded audio data is calculated as follows:

Relative sector number [sec.]×75 [frames/sec.]×2048 [bytes/frame] =58×60×75×2048=534528000 [bytes].

In this case, the bit rate is 64 kilo-bits/sec. or 8 kilo-bytes/sec., so reproduction time length of the audio data is calculated as follows:

534528000 [bytes]÷8000 [bytes/sec.]÷3600 [sec./hr.]=18 hrs. 34 min.

Next, the action of the audio player 10 will be explained with reference to FIGS. 1–5.

Firstly, the CD-ROM 12 is set in the reading section 16 and the player 10 is turned on, the control section 28 controls the reading section 16, according to the programs stored in the memory section 20, to read the retrieving table 14a and 14b stored in the CD-ROM 12, then the control section 28 stores the retrieving table 14a and 14b in the memory section 20 (STEP 100). Successively, the control section 28 check if the input section 18 inputs any commands or not (STEP 102).

In the STEP 102, the control section 28 instructs the action of the player 10 on the basis of the commands inputted by the input section 18.

If the operating keys are pushed, the control section 28 controls the reading section 16 to execute the basic actions of the CD-ROM 12: play, fast forward, rewind, stop, pause, etc. (STEP 104). Then the control section 28 returns to the STEP 102 to wait for the next command.

When the select key is operated, the control section 28 selects the retrieving table according to the instruction of the select key. In the present embodiment, if the select key is move to the "contents" position, the contents table 14a is selected; if the select key is moved to the "page" position, the page table 14b is selected. If the selected key is move to the "time" position, the control section 28 does not retrieve the retrieving table, but retrieves the header of the audio data file 14c (STEP 106). Then the control section 28 returns to the STEP 102 to wait for the next command.

When the retrieving keys are operated, if the selected retrieving table (the contents table 14a or the page table 14b) has been selected, the control section 28 retrieves the groups of sentences in the selected retrieving table (STEP 108). By selecting the retrieving table and operating the retrieving keys, an efficient retrieving manner for retrieving an object data in the CD-ROM 12 can be selected. Namely, the reproduction-starting position of said object data can be known by the selected retrieving manner.

In STEP 108, if the select key is moved to the "time" position, the control section 28 finds the reproduction-starting position of the object data on the basis of moving time and a moving direction, which are instructed by the retrieving keys. With this action, the control section 28 is capable of reading the object writing data in the CD-ROM 12 by the reading section 16. Then the control section 28 returns to the STEP 102 to wait for the next command.

Next, the retrieving action for retrieving optional writing data in the CD-ROM 12 with the select key and the retrieving keys will be explained.

Firstly, the manner of retrieving the contents table 14a will be explained. In this case, the select key is moved to the "contents" position, in STEP 102, so as to select the contents table 14a as the selected retrieving table.

In STEP 102, the retrieving layer is designated by operating the retrieving keys "↑" and "↓". If the "↑" key is pushed, an upper level layer (toward the "chapter" level) is designated; if the "↓" key is pushed, a lower level layer (toward the "section" level) is designated.

By pushing the retrieving keys "←" and "→", retrieving directions in the selected retrieving layer can be designated. For example, in the case of retrieving the "chapter" layer (see the layer data 30 in FIG. 3), the control section 28 changes the retrieving chapter to the adjacent chapter by pushing the retrieving key "←" or "→". Namely, the chapter, which is the group of sentences to be retrieved, can be changed chapter by chapter by each operation of the retrieving key "←" or "→". With this manner, the chapter to be reproduced can be optionally designated. Upon the object group of sentences (the object chapter) is retrieved, the control section 28 finds the position of the starting sector of the object group, and reads the reproduction-starting position in the CD-ROM 12 from the object table 14a with reference to the position of the starting sector, so that the writing data of the object group (chapter) can be reproduced as the audio signals (voice).

Figure 6:
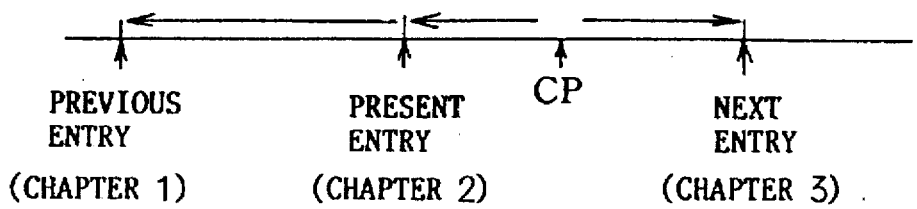
FIG. 6 is an explanation view showing an action of selecting a group of sentences in the contents table shown in FIG. 1.

For example, as shown in FIG. 6, the audio player 10 acts the basic action, e.g., play, at a current position CP in Chapter 2. In this state, if the the retrieving key "←" is once pushed, the reproduction-starting position is moved to the starting position of the Chapter 2. If the the retrieving key "←" is further pushed once, the reproduction-starting position is moved to the starting position of Chapter 1. On the other hand, if the the retrieving key "→" is once pushed, the reproduction-starting position is moved to the starting position of the Chapter 3.

In the case that the retrieving layer is changed to the "paragraph" level or the "section" level by pushing the retrieving keys, the group of sentences to be retrieved and reproduced as the audio signals can be changed paragraph by paragraph or section by section.

The above described retrieving manner with the contents table 14a is preferably used in the case of reading operating manuals of the appliances or special books in the CD-ROM, which are usually read partially.

Secondly, the manner of retrieving the page table 14b will be explained. In this case, the select key is moved to the "page" position, in STEP 102, so as to select the page table 14b as the selected retrieving table.

In STEP 102, the number of page, which is the group of sentences to be retrieved, is designated by operating the retrieving keys "↑" and "Θ". If the retrieving key "↑" is pushed, the unit of digit of the page number, which is shown as the "UNITS OF DIGIT" 32 in FIG. 4, is moved toward upper unit ( toward the number of hundreds unit "100"); if the retrieving key "Θ" is pushed, the unit of digit of the page number is moved toward lower unit ( toward the number unit "1").

By pushing the retrieving keys "←" and "→", retrieving directions and retrieving unit of the page number can be designated. For example, in the case of retrieving unit of the page number is designated "100" (see the "UNITS 0F DIGIT" 32 in FIG. 4), the control section 28 changes the retrieving page every 100 pages, with reference to the number of hundreds unit "100" of the "UNITS OF DIGIT" 32, by pushing the retrieving key "←" or "→". Namely, the page, which is the group of sentences to be retrieved, can be changed every 100 pages by each operation of the retrieving key "←" or "→". With this manner, the page of the book, which is the object group of sentences to be reproduced, can be optionally designated. Upon the object group of sentences (the object page) is retrieved, the control section 28 finds the position of the starting sector of the object page, and reads the reproduction-starting position in the CD-ROM 12 from the page table 14b with reference to the position of the starting sector, so that the writing data of the object pages, e.g., page 0, 100, 200, . . . , can be reproduced as the audio signals (voice).

Figure 7:
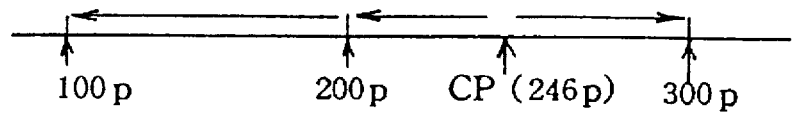
FIG. 7 is an explanation view showing an action of selecting a group of sentences in the page table shown in FIG. 1.

For example, as shown in FIG. 7, the audio player 10 acts the basic action, e.g., play, at a current position CP in 246 page. In this state, if the the retrieving key "←" is once pushed, the reproduction-starting position is moved to the starting position of 200 page. If the the retrieving key "←" is further pushed once, the reproduction-starting position is moved to the starting position of 100 page. On the other hand, if the the retrieving key "→" is once pushed, the reproduction-starting position is moved from the current position CP to the starting position of 300 page.

In the case that the retrieving unit of the page number is changed to "10" or "1", the page to be retrieved is changed every 10 pages or page by page by pushing the retrieving keys as well as the case of the unit of "100", and the writing data of the object page can be reproduced as the audio signals.

Thirdly, the retrieving manner on the basis of the header data of the audio data file 14c will be explained. In this case, the select key is moved to the "time" position, in STEP 102.

The reproduction-starting position of the object group of sentences is found on the basis of the header data. Namely, the writing data of the object group is read from the reproduction-starting position, which is a position moved from a current position CP (see FIG. 8) to designated length of time in the designated direction (forward or backward in the audio data files 14c). So the present retrieving manner is different from above described two manners.

In STEP 102, the select key is moved to the "time" position. Further, the length of time, i.e., moving time, between the current reproducing position CP and the reproduction-starting position of the object group of sentences and moving direction, i.e., retrieving direction, are inputted by the retrieving keys of the input section 18. Note that, the moving time may be previously fixed, e.g., 1 hour, 10 min., 1 min., and may be optionally designated, e.g., 4 min., 13 min., 1 and half hour.

When the moving time is designated, the moving time is made longer, e.g., 1 min.→10 min.→1 hour, by pushing the key "↑"; the moving time is made shorter by pushing the key "↓". The moving (retrieving) direction can be designated by the keys "←" (forward with respect to the current position CP) and "→" (backward with respect to the current position CP).

When the moving time and the moving direction are designated, the control section 28 once stops the basic action, and converts the designated moving time into the data of the sector position on the basis of the bit rate (compressing rate of audio signals or the writing data), which has been recorded in the header data stored in the memory section 20. And, the control section 28 finds the data of the sector position of the object reproduction-starting position on the basis of the converted data of the sector position, the data of the present sector position and the designated moving direction. Then, the control section 28 reads the audio signals (voice) recorded on the CD-ROM 12 from the calculated object reproduction-starting position by the reading section 16, so that the audio signals in the object group of sentences can be reproduced as the audio signals or voice.

Figure 8:
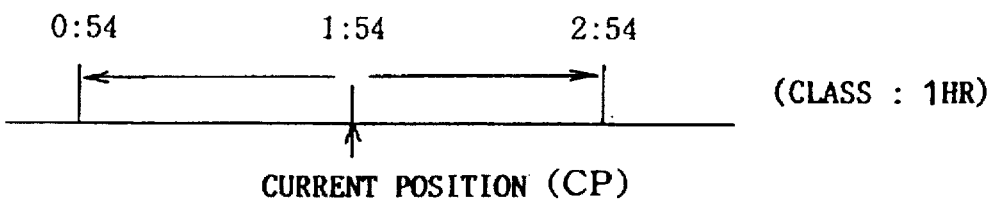
FIG. 8 is an explanation view showing an action of designating a reproduction-starting position according to designated moving time.

For example, as shown in FIG. 8, the current position CP, at which the audio player 10 acts the basic action, e.g., play, fast forward, rewind, is indicated as time "1 min. 54 sec." If the moving time is designated "1 min." and the moving direction is forward "←", the control section 28 executes the basic action again from the position of "0 min. 54 sec."; if the moving direction is backward "→", the control section 28 executes the basic action from the position of "2 min. 54 sec."

The above described retrieving manner based on the time is preferably used in the case of reading literary books in the CD-ROM, which are continuously read from the beginning to the end.

Another retrieving manner will be explained. The contents table 14a and the page table 14b include identification data for each group of sentences as announce messages (size is indicated by "bytes") as shown in FIGS. 3 and 4. The input section 18 has a notice key to instruct noticing action. When the input section 18 instructs the noticing action, if the select key has been moved to the "contents" position or the "page" position, the control section 28 reads the identification data of the present reading group form the memory section 20 and reproduces the identification data or the announce message, as the audio signals (voice), by the audio reproducing section 22. In the case that the select key is moved to the "time" position, the writing data of the present reading group are reproduced as the audio signals in STEP 110 shown in FIG. 2. After the reproducing step, the control section 28 returns to STEP 102.

For example, the identification data to be noticed are a name or a title of the group of sentences, which is being read now, or which is designated by the retrieving keys. In the present embodiment, announce messages of the present retrieved group are the identification data. In the case of designating the contents table 14a, the announce message of the group of sentences are items of the table of contents of the book, e.g., Chapter 1-Paragraph 2-Section 1. On the other hand, in the case of designating the page table 14b, the announce message of the group of sentences are the page numbers of the book, e.g., Page 3, Page 12.

When the control section 28 acts the basic action or retrieves the group of sentences, if the notice key of the input section 18 is operated to instruct the action of notice, the control section 28 once stops the basic action and reads the identification data (the announce message of the present group) from the memory section 20. Then the control section 28 reproduces the announce message as the audio signals (voice) by the audio reproducing section 22 and starts the basic action again. If the control section 28 is retrieving the group of sentences when the notice key is operated, the control section 28 starts to retrieve the same again after reproducing the announce message. Thus, a user can know the group of sentences, which is now read, or the group of sentences, which is designated and which is ready to be read from the beginning, so the retrieving action can be executed easier.

Note that, addresses of the announce message (positions of starting sectors of the messages) in the CD-ROM 12 may be used as the identification data instead of the announce messages.

In the case that the select key is moved to the "time" position, if the notice key is operated, the control section 28 finds the current position according to the present reading data. Then the control section 28 finds the elapsed time from the beginning of the book, the time left, etc. on the basis of the current position and the header data. The elapsed time, the time left, etc. may be noticed by audio signals (voice). The audio data of the elapsed time and the time left can be previously stored in the memory section 20, and they can be retrieved to reproduced as the audio signals.

After the basic actions, e.g., the reverse play, the fast play, the identification data of the group of sentences may be reproduced as the audio signals. In this case, the user can confirm the present reading group.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An audio player for reproducing writing data as audio signals, comprising:

a reading section for reading writing data and a plurality of retrieving tables, each of which includes data indicating interrelationship between each group of sentences in the writing data and a reproduction-starting position of each group thereof, from a recording medium;

an input section for inputting a command for selecting the retrieving table and a command for retrieving the groups of sentences in the selected retrieving table;

a memory section for storing the retrieving table;

an audio reproducing section for converting the writing data into audio signals; and a control section reading the retrieving tables from the recording medium by said reading section and storing retrieving tables in said memory section, said control section retrieving the group of sentences in a selected retrieving table, which is selected by said input section, in said memory when said input section inputs the commands for selecting and retrieving, said control section reading the reproduction-starting position of the retrieved group of sentences, said control section reading the writing data of the retrieved group by said reading section and reproducing the writing data thereof, as audio signals, by said audio reproducing section.

2. The audio player according to claim 1, wherein said recording medium is a CD-ROM, wherein the reproduction-starting position is a sector position of the group of sentences, wherein said input section inputs moving time and moving direction from a present reading position to the reproduction-starting position of an object group of sentences, and wherein said control section reads the sector position of the present reading position by said reading section when the moving time and the moving direction are inputted by said input section, said control section finds moving data according to the moving time and finds the reproduction-starting position of the object group of sentences according to the moving data, the present sector position and the moving direction.

3. The audio player according to claim 1, wherein the retrieving table includes identification data of each group of sentences, wherein said input section inputs an instruction to notice, and wherein said control section reads the identification data of the present group of sentences from said memory section and reproduces the identification data as audio signals by said audio reproducing section when the input section inputs the instruction to notice.

4. The audio player according to claim 1, wherein the retrieving table has a multilayered data structure including such layers of the groups of sentences as chapters, paragraphs and sections, which correspond to head lines in a table of contents of a book, wherein said input section designates one of data layers of the retrieving table as a layer to be retrieved, and wherein said control section retrieves the group of sentences in a designated layer in the retrieving table, which is stored in said memory section, said control section retrieving each chapter, each paragraph and each section, said control section retrieves the group of sentences in the designated layer.

5. The audio player according to claim 3, wherein said recording medium is a CD-ROM, wherein the reproduction-starting position is a sector position of the group of sentences, wherein said input section inputs moving time and moving direction from a present reading position to the reproduction-starting position of an object group of sentences, and wherein said control section reads the sector position of the present reading position by said reading section when the moving time and the moving direction are inputted by said input section, said control section finds moving data according to the moving time and finds the reproduction-starting position of the object group of sentences according to the moving data, the present sector position and the moving direction.

6. The audio player according to claim 3, wherein the retrieving table includes identification data of each group of sentences, wherein said input section inputs an instruction to notice, and wherein said control section reads the identification data of the present group of sentences from said memory section and reproduces the identification data as audio signals by said audio reproducing section when the input section inputs the instruction to notice.

* * * * *

UNITED STATES PATENT AND TRADEMARK OFFICE
CERTIFICATE OF CORRECTION

| | |
|---|---|
| PATENT NO. | : 5,687,144 |
| DATED | : November 11, 1997 |
| INVENTOR(S) | : Tatsuo Nishizawa |

It is certified that error appears in the above-identified patent and that said Letters Patent is hereby corrected as shown below:

Title page,
Item [30], Foreign Application Priority Data, please change to the following:
-- Nov. 1, 1995 [JP] Japan 7-285329 --.

Signed and Sealed this

Eighteenth Day of October, 2005

JON W. DUDAS
*Director of the United States Patent and Trademark Office*